(12) United States Patent
DeTore et al.

(10) Patent No.: US 7,475,018 B1
(45) Date of Patent: Jan. 6, 2009

(54) METHOD FOR STRUCTURING UNSTRUCTURED DOMAINS TO CREATE VALUE

(75) Inventors: Arthur W. DeTore, Fort Wayne, IN (US); Mark K. Clare, Fort Wayne, IN (US)

(73) Assignee: Swiss Reinsurance Company, Zurich (CH)

( * ) Notice: Subject to any disclaimer, the term of this patent is extended or adjusted under 35 U.S.C. 154(b) by 1629 days.

(21) Appl. No.: 09/810,304

(22) Filed: Mar. 16, 2001

Related U.S. Application Data (60) Provisional application No. 60/189,946, filed on Mar. 16, 2000.

(51) Int. Cl.
*G06Q 99/00* (2006.01)
(52) U.S. Cl. .......................................................... 705/1
(58) Field of Classification Search ...................... 705/1
See application file for complete search history.

(56) References Cited

U.S. PATENT DOCUMENTS

| | | | |
|---|---|---|---|
| 5,542,024 A | | 7/1996 | Balint et al. |
| 5,694,523 A | | 12/1997 | Wical |
| 5,713,045 A | | 1/1998 | Berdahl |
| 5,768,580 A | | 6/1998 | Wical |
| 5,991,751 A | * | 11/1999 | Rivette et al. ................... 707/1 |
| 5,999,907 A | * | 12/1999 | Donner ............................ 705/1 |
| 6,035,305 A | | 3/2000 | Strevey et al. |
| 6,044,354 A | * | 3/2000 | Asplen, Jr. ....................... 705/7 |
| 6,112,201 A | | 8/2000 | Wical |
| 6,199,034 B1 | | 3/2001 | Wical |

FOREIGN PATENT DOCUMENTS

| EP | 467584 A2 * | 1/1992 |
|---|---|---|

* cited by examiner

*Primary Examiner*—Jonathan Ouellette
(74) *Attorney, Agent, or Firm*—Barnes & Thornburg LLP (57) ABSTRACT

A method managing knowledge to impart value comprises the steps of developing a domain model from knowledge in an unstructured domain, determining whether there is value in further developing the initial domain model to include a knowledge map and, if so, developing and implementing the knowledge map, and determining whether there is value in further developing the knowledge to include a knowledge clearinghouse and, if so, developing an implementing the knowledge clearinghouse. Certain embodiments may include the additional steps of developing and implementing a knowledge network. The step of developing the initial domain model may comprise the steps of defining organizational and content scopes relevant to the unstructured domain, and identifying entities and processes subject to benefit from structuring of the knowledge. This step may additionally comprise the step of conducting a cost/benefit analysis of the initial domain model based on the organizational and content scopes and identified benefited entities and processes.

14 Claims, 5 Drawing Sheets

METHOD FOR STRUCTURING UNSTRUCTURED DOMAINS TO CREATE VALUE

RELATED APPLICATIONS

This application is based upon U.S. Patent Application Ser. No. 60/189,946 filed on Mar. 16, 2000, the complete disclosure of which is hereby expressly incorporated by reference.

FIELD OF THE INVENTION

The invention relates to a method of managing the knowledge of an organization by structuring the knowledge into assets in a way that creates value.

BACKGROUND AND SUMMARY

An organization's assets are often defined by reference to tangible assets, such as capital, equipment, physical structures, and materials owned by the company. Assets, however, may also include intangibles, such as patents, copyrights, trademarks, good will, and trade secrets. In fact, collective knowledge that the organization holds may be an asset as well.

Knowledge can be defined in many different ways. For example, knowledge may be defined as information organized for problem solving or action. Knowledge may also be defined as the interaction between and the experiences held by people. Or, knowledge may be defined as simply a justified true belief held by someone. In other words, knowledge may mean different things to different people. Most often though, any type of knowledge, regardless how it is defined, can have value to someone. In the business community, for example, knowledge in a particular area or discipline that is held by a company has value to itself, but also to others, such as customers or competitors. This knowledge can, hence forth, be considered an asset, or, specifically referred to as a knowledge asset. Knowledge assets refer to any active, organized and reasoned content. Specifically, the content of a knowledge asset can be data, information or meaning. The structure of the knowledge asset can be the relationships among components of the content or how the content is organized. The reasoning of the knowledge asset can be a process that uses the structure to access the content in order to perform cognitive tasks like decision making, problem solving, or interpretation. Such knowledge assets often manifest themselves in a company by the know-how of employees who are experts in particular areas, product development groups experienced in developing products or services, and electronic information accumulated through research, development, production and marketing. A detailed recitation of knowledge assets is provided in the publication *Knowledge Assets: A Professional's Guide to Valuation and Financial Management*, by Mark Clare and Arthur DeTore, Harcourt Professional Publishing, New York, 2000, the complete text of which is hereby expressly incorporated into the specification by reference.

Because knowledge in a particular discipline may be large and disorganized, it may not be readily accessible to users either inside or outside the organization. Access to this knowledge, however, can be an important factor in determining value. Knowledge that is not accessible may have little practical value regardless of its content. For such knowledge to have value, it should be organized and accessible.

For purposes of the discussion herein, an area of knowledge will be referred to as a domain. Specifically, a domain refers to a particular body of knowledge, and a set of methods for creating, sharing and using that body of knowledge to achieve a given purpose. Academic fields of study (e.g., mathematics or fine arts), professions (e.g., law or medicine), departments within a business (e.g., accounting or human resources) and even specific areas of expertise (e.g., the ability to troubleshoot complex equipment on an assembly line) are all examples of domains. Structured domains, like law and medicine, are very organized, formally managed, and mature. They have highly articulated bodies of knowledge, and well-recognized and established methods for creating, accessing, and using that knowledge. Some domains, however, are more structured than others. Within business, for example, design engineering is a more structured domain than general management problem solving, and financial accounting is a more structured domain than coaching and developing employees.

Unstructured domains tend to be less clearly defined than their more structured counterparts. This is because, typically, unstructured domains cut across formal organizational lines, departmental boundaries, functional areas, or product families. General management, information technology management and, now, knowledge management, have all been concerned with developing methods and devices for structuring these domains in the hopes of more effectively utilizing the resources they contain and, thus, creating additional value for the organization. Today, significant investments are being made in document management, customer information systems, business intelligence processes, intranets, enterprise-wide information portals, managing intellectual capital and doing business on the internet, all of which are, to some extent, domain structuring tasks.

Entrepreneurs, management consultants, technology product vendors and others have strived to develop methodologies and offerings for partially structuring particular domains. Currently, however, there is no developed general purpose domain structuring methodology. For example, software applications and methodologies are readily available for structuring the domain of competitor information. Although their solutions can be very comprehensive for competitor information, they do not readily extend to, and are not useful for structuring other domains. On the other hand, many tools and methods exist for structuring "web content" for use both inside the organization (e.g., intranets) and outside the organization (e.g., web sites or e-business sites). Web content methodologies can be general enough to be applied to several domains. However, at best, they only partially structure domains. This is because information and knowledge sources of most domains go far beyond what can be used as web content.

The method of the present invention is useful because it can be used for structuring any domain to the appropriate degree. For purposes of this discussion, appropriate degree refers to the extent that structuring the domain is cost beneficial or otherwise value creating. This method is further useful because it acknowledges the fact that in many cases it is not possible to know in advance how much structure a domain requires to be value creating. This method, therefore, uses a staged evolutionary approach that determines how the domain structuring process creates value at each step and uses that information to guide the introduction of additional processes, technologies, and practices (e.g., other structuring agents) into the domain. Too much structuring of a domain might impede its function and might represent an over investment in technology and organizational "improvement." Too little structuring, however, might indicate that key resources are being under leveraged. The method as described herein encourages a form of self-organization in the domain guided by selecting those structuring agents that create the most value from the domain.

The method disclosed herein is further useful in that it can be used to define common models, techniques, technology toolkits and rules within the domain. This can translate into lowered costs and risks associated with managing the many diverse domain structuring activities which many organizations may face.

Accordingly, an illustrative embodiment of this method provides the steps of developing an initial domain model from knowledge in an unstructured domain, determining whether there is value in further developing the initial domain model to include a knowledge map, developing and implementing the knowledge map if such value is determined, determining whether there is value in further developing the knowledge to include a knowledge clearinghouse, and developing and implementing the knowledge clearinghouse if such value is determined. This embodiment may further comprise the steps of determining whether there is value in further developing the knowledge to include a knowledge network, and developing and implementing the knowledge network if such value is determined.

It is contemplated that the illustrative embodiment may include the following steps while developing the initial domain model: defining organizational and content scopes relevant to the domain, identifying entities and processes subject to benefit from structuring of the knowledge, and conducting a cost/benefit analysis of the initial domain model based on the organizational and content scopes and identified benefitted entities and processes. The content scope may comprise explicit and implicit content. It is further contemplated that determining whether there is value in further developing the initial domain model into the knowledge map may include determining costs and specifications of the knowledge map, determining what value is created by developing the knowledge map, and evaluating what logistics and risks that exist by maintaining the knowledge map.

It is contemplated that the illustrative embodiment may include the following while developing and implementing the knowledge map: plotting an organizational structure of the content scope from the initial domain model, developing the content scope into the knowledge map pursuant to the organizational scope, providing access to the knowledge map, and evaluating and refining the knowledge map.

It is contemplated that determining whether there is value in further developing the knowledge to include the knowledge clearinghouse may include determining costs and specifications of the knowledge clearinghouse, determining what value is created by developing the knowledge clearinghouse, and evaluating logistics and risks of maintaining the knowledge clearinghouse. Developing and implementing the knowledge clearinghouse may further comprise the steps of collecting information about the explicit content within the knowledge map, organizing the information in a manner relevant to the domain, providing access to the knowledge clearinghouse, and evaluating and refining the knowledge clearinghouse.

It is contemplated that determining whether there is value in further developing the knowledge to include the knowledge network may include determining costs and specifications of the knowledge network, determining what value is created by developing the knowledge network, and evaluating logistics and risks of maintaining the knowledge network. Developing and implementing the knowledge network may further comprise developing the implicit content of the knowledge map.

Another illustrative embodiment of a method of managing knowledge to impart value may comprise the steps of: developing an initial domain model from knowledge in an unstructured domain, developing and implementing a knowledge map, and developing and implementing a knowledge clearinghouse. The method may also comprise developing and implementing a knowledge network.

Another illustrative embodiment of a method of managing knowledge to impart value may comprise the steps of: developing an initial domain model by identifying knowledge in the form of implicit and explicit knowledge, developing the implicit and explicit knowledge into a knowledge map and implementing same, and developing a knowledge clearinghouse that provides access to the explicit knowledge coincident with the knowledge map. The method may also comprise developing a knowledge network that provides a mechanism to mediate sharing of the implicit knowledge, and evaluating the method between each developing step to determine whether proceeding to a subsequent developing step imparts value to the knowledge and is, therefore, justified. The method may also comprise developing the initial domain model further by developing organizational, content and process scopes of the knowledge.

Additional advantages and novel features of the invention will become apparent to those skilled in the art upon consideration of the following descriptions.

BRIEF DESCRIPTION OF DRAWINGS

The illustrative embodiment will be described hereinafter with reference to the attached drawings which are given as non-limiting examples only, in which.

Corresponding reference characters indicate corresponding parts throughout the several views. The exemplification set out herein illustrates an embodiment of the method, and such exemplification is not to be construed as limiting the scope of the invention in any manner.

GLOSSARY

Certain recurring terms used in the specification are provided in this glossary to assist in better understanding the specification. This glossary is not to be construed, however, as limiting the scope of the invention, nor limiting the following Detailed Description of the Drawings, nor are any of the explanations accompanying the following terms to be construed as an exhaustive definition of that term.

"Content scope" defines the types of on-line and off-line content, information, and data resources that will be considered in the domain.

"Domain" refers to a particular body of knowledge, and a set of methods for creating, sharing and using that body of knowledge to achieve a given purpose.

"Explicit content" includes any content that is not exclusively people-based, including documents, databases, email and so on. The content can be on-line or off-line.

"Gate" is a decision point to determine if further steps in the process are warranted.

"Implicit content" is information held in the mind of an individual or collectively in the minds of teams or groups.

"Initial domain model" is refined information about the "target domain," and includes a description of the scope and economics of the domain.

"Knowledge clearinghouse" is a central agency for the collection, classification, and distribution of information or transactions within the domain.

"Knowledge map" is a device for structuring the content scope of the domain by cataloging and describing the key content sources in the domain.

"Knowledge network" is a technology-based platform and the supporting organizational structures and management practices for connecting people to people and thereby structuring the tacit knowledge in the domain.

"Off-line content" is information or knowledge in physical form, such as paper documents, files, card catalogs, and manuals.

"On-line content" is information or knowledge in electronic form, such as databases, document management systems, and email.

"Organizational scope" is the companies, departments, and key knowledge workers that fall within the definition of the domain.

"Process scope" identifies those business processes that should be improved through structuring a domain.

"Stages" are discrete activities that make up a portion of the overall process.

"Structured domains" are highly articulated bodies of knowledge and sets of methods for creating, sharing, and using knowledge to create value.

"Taxonomy" is a standardized vocabulary used to organize and define the semantics of the content within the domain.

"Unstructured domains" are domains that are less clearly defined than their more structured counterparts.

DETAILED DESCRIPTION OF THE DRAWINGS

Figure 1:
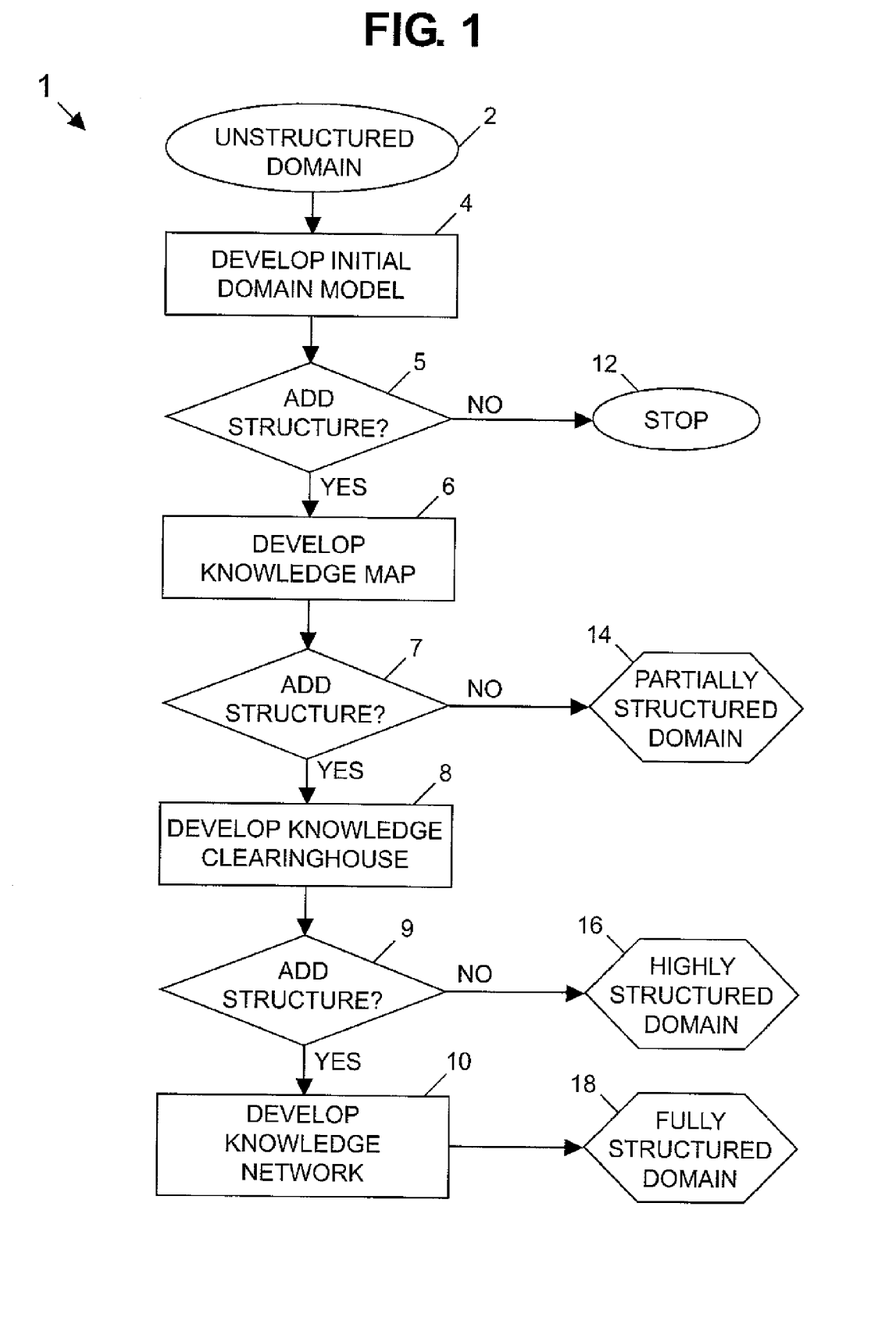
FIG. 1 is a flow chart of an illustrative embodiment of the structuring method.

The illustrative embodiment of the method comprises a knowledge management process for structuring unstructured domains to create business value. This embodiment is described in terms of a stage-gate architecture. Stage-gate architecture refers to a process of using discrete sets of structuring activities that make up a portion of the overall process (stages) linked by decision points (gates) that examine the value of further structuring which must be passed in order to move from one stage to the next. A flow chart outlining the method of structuring an unstructured domain is shown in FIG. 1, and is indicated by reference numeral 1.

The first step is identifying an unstructured domain that would be a likely candidate for structuring. Such a domain is indicated by reference numeral 2. As will be described hereinafter in greater detail, method 1 depicts several stages to incrementally structure domain 2. The stages include developing an initial domain model 4, a knowledge map 6, a knowledge clearinghouse 8 and a knowledge network 10. After developing the initial domain model 4, and before implementing any further structuring, gates are interposed to evaluate the value of further structuring. For example, in FIG. 1, after developing the initial domain model 4, a gate 5 examines the value of advancing to developing knowledge map 6. Gates 7 and 9 are interposed between developing knowledge map 6 and knowledge clearinghouse 8, and clearinghouse 8 and knowledge network 10, respectively.

It is contemplated that the domain-structuring method 1 may terminate at any of the gates 5, 7, 9 or at the end of stage 10. It is appreciated, however, that if the process is terminated before the end of stage 10, the process may include maintenance of the knowledge management infrastructure, as indicated by reference numerals 12, 14, 16, 18. For example, if it is determined at gate 7 that it would be most cost effective to terminate the process after stage 6 before implementing the knowledge clearinghouse, the knowledge map of stage 6 will be maintained even though it was determined that no additional structuring is required.

Before unstructured domain 2 can be structured, it must first be identified. Such domains are identifiable within an organization or company because the breadth of knowledge, techniques, and relationship with other domains are not clearly defined or articulated. For example, typical unstructured domains in a company involve the creation, sharing and use of customer, product, and competitor knowledge. Such domains are undefined because they involve several people across unrelated business groups that might not communicate with each other about such subjects. Each group might have important knowledge relating to problem solving, but without some structure of the knowledge as a whole, there can be no central access to it and, thus, little value in it.

It is contemplated that domain 2 may be defined either broadly or narrowly, depending on the intended use of the knowledge and its ability to be value creating. For example, it may be costly for a firm to resolve support issues pertaining to a complex product because the knowledge and skill needed to do so is highly distributed around the organization. Such information may be stored in file cabinets, databases, reports, web sites, news feeds, email, sales people and many other sources. It is created, shared and used in a wide variety of formal and informal ways. In addition, there are many people who have special knowledge and relationships with specific customers related to the product. No one person knows everything, however, and there is no one location to find all the resources available related to the product. This is an example of a domain ripe for structuring and could be defined as "knowledge required to support the product." Such knowledge will obviously be useful to the organization or company internally, and/or to its customers. It is, therefore, conceivable that structuring such a domain will add overall value to the organization or company.

Figure 2:
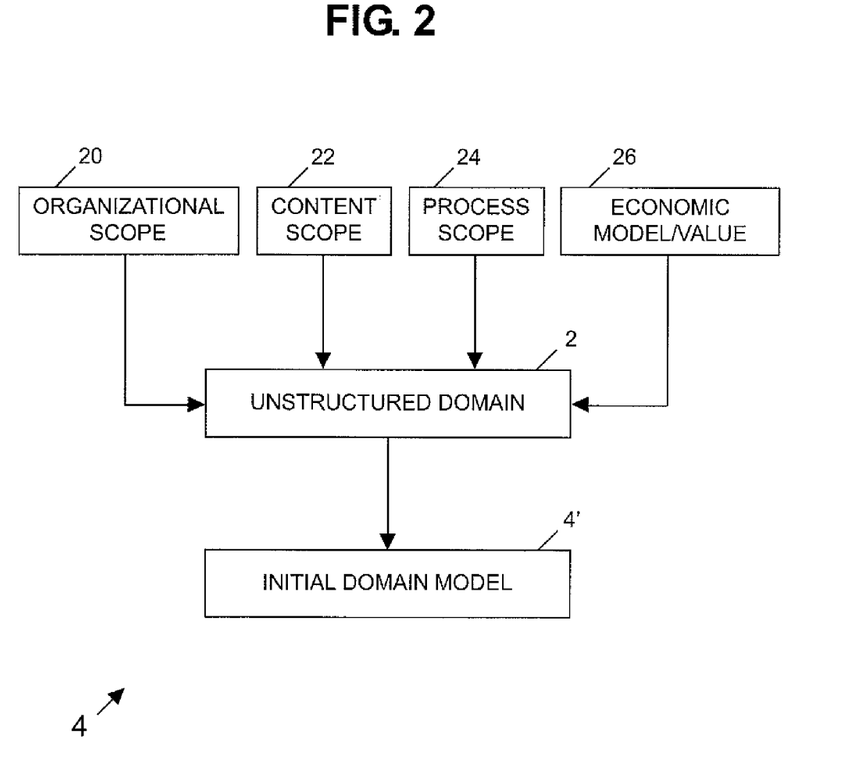
FIG. 2 is a flow chart to the process of developing the initial domain model.

As shown in FIG. 2, once a domain is identified and defined, it will be described as an initial domain model 4'. It is considered an "initial model" because it is refined and further developed into a more structured domain through the other stages 6, 8, 10. One of the benefits of creating an initial domain model is that it forces a careful thinking of what should be in and out of scope and why. Refining the scope of unstructured domain 2 into an initial domain model 4' involves defining the organizational scope 20, the content scope 22, the process scope 24 and the economics 26 of unstructured domain 2.

The organizational scope 20 refers to companies, departments, key knowledge workers, users and/or other parts of the organization that fall within the definition of, or are impacted by, unstructured domain 2. Knowledge workers are those members of the domain who contribute knowledge and solutions that make up the substance of the domain. This may include personnel, for example, from engineering, product management, marketing and manufacturing disciplines. Knowledge users can be in the customer service department and mobile post-sales support engineering groups, for example. The organizational scope of the domain structuring effort may also encompass the extended expertise of suppliers who might have assisted in troubleshooting. Defining such an organizational scope begins to focus the task of structuring domain 2 because it identifies personnel relevant to the domain who hold knowledge on the subject of the domain.

Once the sources of the knowledge for domain 2 are identified from organizational scope 20, the content scope 22 can be defined. The content scope 22 defines the types of knowledge that will be considered and included in domain 2. Such information is generally structured into explicit and implicit content. Explicit content is information that is not exclusively people-based, such as databases and paper documents. Implicit content is information held in the mind of an individual or collectively in the minds of teams or groups. Explicit content is further structured into on-line and off-line information indicated by reference numerals 30 and 32, respectively. (See FIGS. 3 and 4.) On-line information 30 refers to information that is in electronic form, such as databases, document management systems, and email. Off-line information 32, in contrast, refers to information that is in a more physical form, such as paper documents, files, card catalogs, and manuals.

Defining the content scope 22 not only serves to further structure the domain, it also serves to begin creating a taxonomy for the domain that helps to define a semantic model. In other words, by accumulating all the on-line and off-line information 30, 32, common subject areas can be identified and information about those subject areas can be grouped or classified, and word usage can be developed into a common vocabulary. Such organization provides substantial structure to domain 2.

Having a preliminary taxonomy in place allows cataloging of the information or knowledge to begin. While continuing to define the content scope, key properties of the information are documented. Such properties include any of the basic information that will be needed to find and access the content. Initially, these properties include the description of the information, its location, access methods (e.g., ask an engineer or log onto database), and what products, process steps and problem steps it is used for.

The process scope 24 identifies those business processes that should be improved through structuring domain 2. By defining such a scope, the identification of any current business process that can be improved can be an important indicator of at least some value that will result by structuring the domain. For example, a domain structured to improve the customer service process from initial contact through resolution adds efficiency and accuracy to the process which translates into cost savings and, ultimately, into value. It is contemplated that process scope 24 can be described by high-level models of the key roles, activities and decisions relevant to domain 2.

An understanding of the knowledge and information economics of the domain will assist in demonstrating the potential value structuring such a domain can produce. This understanding involves discovering the link between how knowledge is created, shared and used in the domain 2 and the economics (i.e., income statement and balance sheet) of the structuring organization. To be effective at guiding decisions about how to structure domain 2, the economic model 26 goes beyond what is typically developed to cost justify projects to include clear and testable cause-and-effect assumptions about how changes in the structure of the domain will impact key drivers (e.g., revenue, costs, etc.) of value for the organization. For example, such economic models often include a description of the information, transaction and quality costs within the domain. Transaction costs refer to all the costs associated with all searching, negotiating, contracting and administration. Internal transaction costs involve the data gathering, communication and collaborative problem-solving activities that are common (and some dominate) in many forms of knowledge work. Information costs refer to the costs associated with collecting the information needed to make decisions. Quality costs refer to preventative costs, such as the cost of taking action to avoid error, defect and malfunction, appraisal costs, such as the cost of detecting errors before they create a product/service failure, internal failure costs, such as the cost of downtime, and external failure costs, such as the cost of product/service failures post sale. It is contemplated that specific assumptions about all these costs are shaped by the high-level workflow models and role descriptions developed to define the process scope 24.

Developing the economic value model 26 will provide an important first indication as to the resulting value, if any, to the structuring of domain 2. For example, in a customer service process, it was determined that a percentage of first call resolutions is the key value driver (i.e., having a strong impact on cash flow or real option value) for support requests of low to medium complexity, and that the length of customer downtime is the critical value driver for complex support requests. Furthermore, it was found that transaction costs were very high for most support requests that the customer service professional could not resolve using his/her own tacit knowledge. And finally, it was found that had the customer service professional had the information held by others in the group, the question could have been answered immediately. The resulting economic model and the strategic importance of customer service for this organization easily justifies an investment in the development and implementation of a further structured domain.

Having a developed initial domain model 4' in place, the first gate 5 in structuring process 1 is then considered. (See FIG. 1.) As with other processes that use such a stage-gate architecture, and as previously discussed, gate 5 is a decision point to determine whether further steps in the process are warranted. To make such a decision, the next structuring step must first be examined. Accordingly, the next step in the process is to develop and implement knowledge map 6. A knowledge map catalogs and describes the key content sources in a domain, expediting rapid access and use. Typically, the core of a knowledge map, as further described in more detail below, is a software application that catalogs all the key data, information and knowledge sources in the domain. The catalog can be used by knowledge workers and users in the domain to rapidly identify, locate and access the critical content needed to drive decisions and business processes. In essence, a knowledge map is a device that develops the content scope of the domain. A knowledge map can lower transaction costs by making it easier to locate and access critical information, as well as lower quality costs by ensuring the best possible information is used in any decision-making processes.

Typical criteria associated with gate 5 are specifications and buy/build cost estimates for developing knowledge map 6, a model of how value will be created in initial domain model 4' by developing knowledge map 6, and identification of key risks and strategies for managing them. In an extreme example, if developing a knowledge map is obviously well beyond the means of the organization or company, it would make little sense, or may even be financially impossible to implement any further structuring. Even if value is added, the organization or company must be able to afford investing in this next step.

The details of developing knowledge map 6 will be discussed in greater detail below. Before developing, however, understanding how value will be created beyond the value created from developing initial domain model 4 will assist in deciding whether continuing to the next step is even necessary. Of course, it is always wise to have an understanding of the risks involved in engaging in such a venture, as well as contemplating how such a knowledge map will be maintained before moving to this next step.

Figure 3:
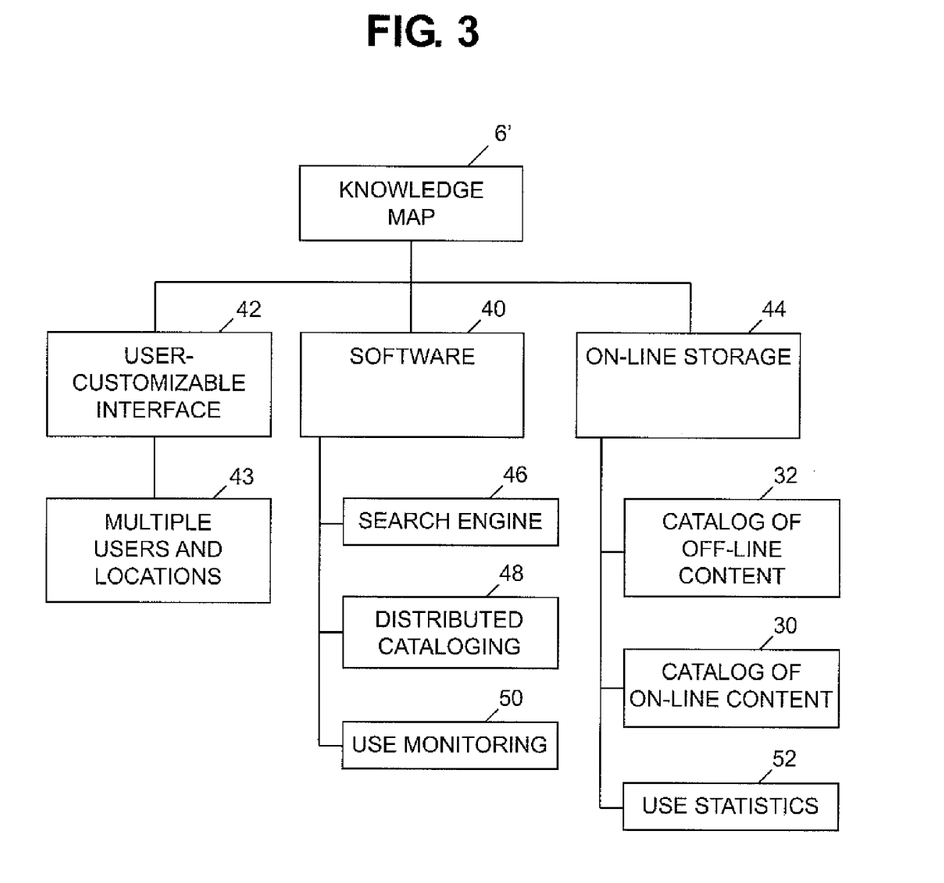
FIG. 3 is a schematic representation of a knowledge map.

Like a regular map, a knowledge map plots out the general location, features and access routes to things. It tells you where things are, how to get to them and what you can expect when you get there. For example, a common knowledge map is the card catalog system maintained at a library. A card catalog system helps a user locate books, magazines and other resources quickly. Originally, card catalogs used paper 3×5 cards that had to be searched manually. Most libraries today have automated their card catalog systems. Without such systems, large libraries would be extremely inefficient and perhaps even useless. Knowledge maps, like knowledge map 6' shown in FIG. 3, are analogous to card catalogs, yet go beyond such catalogs in several important ways. First, the scope of what is cataloged is often quite broad and includes people, such as an expert directory, off-line files, such as contents of file cabinets, web content, databases, and so on. Second, knowledge maps record precise statistics on the frequency and type of use they receive by members of the domain. These "use statistics" are interpreted using a value model to make decisions about which resources are the most valuable in the domain and how that domain should be further structured. In addition, knowledge maps, unlike library systems, often support distributed cataloging. Distributed cataloging provides a user interface for any member of the domain to catalog an item that they think will prove valuable to others in the domain. Finally, general purpose knowledge maps often integrate with other cataloging or inventory-oriented applications, such as phone directories, skills databases, and library systems, to further expand its capabilities and usefulness.

It is contemplated that the development of knowledge map 6' may include refining the specifications of the initial domain model 4', depending on the parameters or requirements of the organization. In addition, certain logistical issues will be considered during the development of the map. For example, the organization may consider whether to purchase the knowledge map software or have the software custom-built. Also, once the software is in place and the knowledge map is implemented, it will have to be tested and supported. These are, of course, considerations previously contemplated during gate 5, previously discussed, but will now have to be implemented.

In at least one embodiment, knowledge map 6' provides the following functions: the ability to inventory any type of content, such as books, web sites, skills, etc., integrate with other inventory systems, such as library systems, phone directories, etc., provide flexible searching and matching engines, support distributed cataloging, and provide visual/graphic content display and navigation. In addition, the map may include convenient access from any designated location, permit customization of the maps by each end-user, and provide monitoring and tracking features to determine future needs and functionality.

A benefit of developing the knowledge map 6 in furthering the structuring process is the creation of the common taxonomy or semantic model for navigating the content of the domain, as previously discussed. For example, the taxonomy for the knowledge map may be organized around a trouble-shooting discipline that the customer support professionals use. Categories on the map may include process steps, such as "classify the problem," "escalate the problem," and "classify the problem types" (e.g., such as metal fatigue and motor failure); as well as "classify the product types," such as model A and model B. If care is taken to understand the differences in vocabulary and terminology across the departments in the domain, synonyms and definitions may be set up and the common taxonomy further organized.

Organizing such a taxonomy allows users to refer to the same concept using multiple terms (i.e., synonyms). Users learn and adapt the vocabulary that is used by knowledge workers collaborating across various departments in the domain, creating a standardized vocabulary. Users, however, may develop personalized maps by defining their own categories and organizing structure, such as organizing file folder hierarchies and picking file folder names. This allows a developer to learn a great deal about how knowledge workers think about the content and key concepts in the domain. This information can be used to further refine and structure the initial domain model.

In the illustrated embodiment, three major components are integrated to form knowledge map 6'. Those components are software 40, user-customizable interface 42, and on-line storage 44, as shown in FIG. 3. Software 40 may illustratively be a browser-based application that implements knowledge map 6'. The taxonomy, previously discussed, is used as a visual display of the domain content to support illustrative point-and-click navigation. Software 40 may also include a search engine component 46 to navigate through map 6'. It is further contemplated that an editor component (not shown) may be included so that any knowledge worker of the domain may catalog new content for reuse by other knowledge workers. A tracking and monitoring component 50 may be included to capture use statistics 52 which are stored on-line.

The user-customizable interface 42 of knowledge map 6' can be customized by the end-user. Conventionally, the user has at least two levels of control. The first is the ability to personalize the content that is displayed. For example, in the case of knowledge map 6', the user may choose to see only that information that pertains to his/her specific job and filter out the rest. The second is to personalize the display itself. Such parameters as font-size, color schemes, menu displays, tool bars, as well as other aspects of the interface's look-and-feel, can be changed. In a knowledge map, this would include, for example, the ability to toggle between a compact and verbose display of the information contained on each item cataloged in the knowledge map 6'. Such functionality improves the user's point-and-click navigation experience, thereby decreasing the time it takes to locate relevant information.

The multiple users and locations function 53 allows knowledge map 6' to be accessed and/or modified by multiple knowledge workers from different locations at the same time. Knowledge map 6' is not intended to be a single-user tool. Rather knowledge map 6' is intended to be accessible by any knowledge worker, not only for access to the information, but also for distributed cataloging 48, (i.e., the input of new information to knowledge map 6' recently learned in the domain).

Distributed cataloging 48 provides user interface 42 for any member of domain 2 to catalog an item that they think will prove valuable in the domain. Distributed cataloging 48 is typically part of the software 40 and asks the user a series of questions about the item (e.g., web site, subject matter expert, article, etc.) that they want to catalog, and then automatically provides guidance on how to enter the item into knowledge map 6'. In one embodiment, distributed cataloging 48 may include automatic document and content classification to minimize the effort required to add additional items to knowledge map 6'. It is further contemplated that knowledge map 6' may include quality control procedures to review and audit knowledge map 6' items that have been changed or added by users.

As the knowledge map is delivered to users in domain 2, catalogs 30, 32 will expand as knowledge workers add more items and the taxonomy is refined. Use statistics 52 are collected and analyzed using economic models such as clear and testable cause-and-effect assumptions about how changes in the structure of the domain will impact key drivers (e.g., revenue, costs, etc.) of value for the organization, as previously discussed. These models will be used to compute the value that is being created by using knowledge map 6', as well as indicate the appropriate scope for continued domain structuring activities. For example, knowledge map 6' could lower the transaction costs associated with sales staff collecting the information needed to prepare for a client visit. To measure and track this benefit, an economic model is used that quantifies the expense and opportunity cost associated with sales staff engaging in data gathering and synthesis tasks. With this model and the actual use statistics from knowledge map 6', it is possible to estimate part of the value that domain structuring is creating. It is contemplated, however, that there are many possible models—improved decision making, enhanced collaboration and accelerated learning—to name a few that can be used. Part of the method of domain structuring is to formally develop these models in an economic sense and use them to tune the knowledge management (i.e., map, clearinghouse and network), as well as influence the go/no-go decisions that are made at the gates in the process. The analysis will also help to identify the clearinghouse functionality that will be most beneficial for further structuring, if necessary.

After development of knowledge map 6 is complete, a decision is made whether to further structure initial domain model 4 by developing a knowledge clearinghouse (step 8). Alternatively, knowledge map 6' can be maintained as a partially structured domain 14. (See FIG. 1.) A knowledge clearinghouse 8' (FIG. 4) provides centralized access to all on-line content 30 that exists in domain 2, as well as a catalog of off-line resources 32. The core of knowledge clearinghouse 8', as described in more detail herein, is a software application that provides a single point of entry for searching and accessing all explicit content within domain 2. Clearinghouse 8' is analogous to a portal that can be used by knowledge workers in the domain to rapidly find, access and use the relevant explicit content no matter where it is located or how it is stored. Like knowledge map 6', knowledge clearinghouse 8' is a device for further structuring the content scope of domain 4'. In contrast to knowledge map 6', however, clearinghouse 8' provides additional structuring to the content that originally may have been non-electronic, such as paper files, rather than all explicit content of the domain. A clearinghouse is, thus, a deeper structuring agent than a knowledge map. This further structuring can result in lower transaction costs by removing the need for knowledge workers of a domain to log in and out of multiple systems depending upon the information they need. Knowledge clearinghouses also help to lower quality costs by ensuring easy access to information that would not normally be used in support of a business process or decision.

The criteria for determining the value of developing clearinghouse 8 is similar to that of developing knowledge map 6. Accordingly, to proceed through gate 7, the specifications and buy/build cost estimates for developing knowledge clearinghouse 8 should be evaluated. In addition, a model of how value will be created beyond knowledge map 6 should be constructed, and key risks and strategies for managing those risks should be identified.

Figure 4:
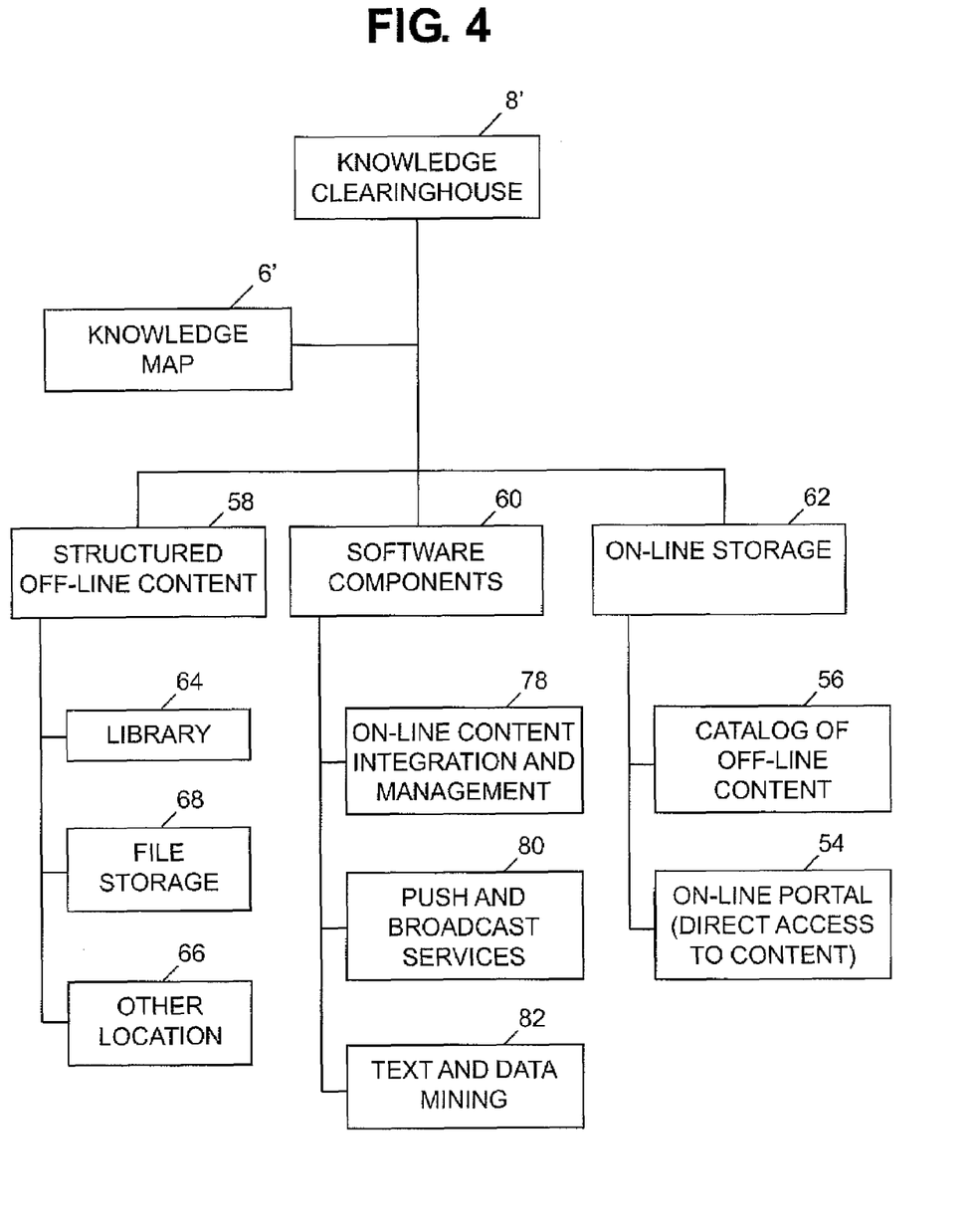
FIG. 4 is a schematic representation of a knowledge clearinghouse.

Similar to a conventional clearinghouse, knowledge clearinghouse 8' acts as a central agency for the collection, classification, and distribution of information or transactions. It is the place to go to locate and access the explicit content initially cataloged as off-line content 32 from knowledge map 6'. For example, analogizing a library's automated card catalog (knowledge map), a clearinghouse not only catalogs a book, it also has reviews, summaries and perhaps even the full-text of the book, and is available at a glance. The reviews, summaries, and full-text comprise the on-line content 30 that clearinghouse 8' captures and brokers, thus, deepening the structuring of knowledge map 6'.

Clearinghouses, like maps, are guides for anyone needing to locate, access and use the highly-distributed knowledge resources of the organization. Because clearinghouses provide direct access to explicit content, they go much further than maps in supporting knowledge use and capture. For example, a report that is on-line can be read, annotated, excerpted or otherwise used, whereas just the reference to the report (as provided by the map) cannot. Providing content, rather than just a reference, enables information to be accessed much more directly. This means that clearinghouse 8' can be used to have a more dramatic impact on the effectiveness and efficiency of the decision-making and business processes. In other words, if knowledge map 6' represents an incremental improvement for domain 2, clearinghouse 8' represents a re-engineering of the business processes of domain 2, thus, creating additional levels of business value.

Though clearinghouse 8' typically manages the explicit off-line content 56 of domain 2, knowledge clearinghouse 8 also comprises on-line content 54 (e.g., email or database information). It is appreciated that it may not be cost-beneficial to convert all off-line content 32 from knowledge map 6' to on-line content 54, so knowledge map 6' may still play a critical role in cataloging some off-line content 32. Consequently, knowledge map 6' and clearinghouse 8' may work together as symbionts. Accordingly, the architecture of clearinghouse 8' is knowledge map 6'. Again, the noted difference being that clearinghouse 8' provides direct access to some or all of the content, rather than just cataloging it.

Examples of conventional technologies used to structure on-line content 54 of clearinghouse 8' include middleware, document management systems, intranets and enterprise information portals. Examples of techniques to structure off-line content 56 include common filing systems and special purpose libraries.

Knowledge clearinghouse 8', as shown in FIG. 4, comprises integrated elements of knowledge map 6' with further structuring. Such structuring is organized into three major components: structured off-line content 58, software components 60, and on-line storage 62. Structured off-line content 58 organizes the explicit or off-line content 32 that cannot be converted into on-line storage 62. For example, physical objects, such as models, prototypes, paper files, and books, cannot be stored in a computer. Rather, they are housed in a central location, such as a library 64, file storage 68, or other location 66, suitable to house such objects. These locations can be associated with the off-line catalog 56 from on-line storage 62 to provide a system for locating all off-line content, no matter the location of that content.

The software components 60 of clearinghouse 8' include on-line content integration and management 78, push and broadcast services 80, and text and data mining 82. Knowledge clearinghouse 8' presents a single unified view of on-line content 30 (see FIG. 3) to knowledge workers in the domain. This includes for example, the ability to integrate content either logically or physically as is done with middleware, portals, enterprise document management and data warehousing technologies. Once on-line content 30 has been integrated, however, it should be managed. This includes creating and maintaining new content as is done with web publishing, database systems and desktop productivity tools.

Push and broadcast services 80 refer to the delivery of content by means other than user-directed search or browsing. Typical examples include software agents or bots that automatically search the clearinghouse for content of interest to the user on a scheduled basis, an alert service that lets users know when content of interest has been changed or updated, and webcasts and datacasts that offer a channel (like radio or TV) with programmed content that users in the domain can tune into.

Text and data mining services 82 refer to the ability to automatically or semi-automatically discover previously unrecognized and valuable patterns or links in the content of the clearinghouse. Techniques include machine learning, rule induction, statistical pattern recognition, neural networks, genetic algorithms, information extraction, text processing and a wide-range of techniques from natural language processing. For example, a data mining application might use rule induction to discover important buying behaviors and relationships in a customer database. For text mining, a lexical pattern classifier could be used to automatically cluster documents into meaningful groups or even generate a taxonomy for organizing them into a knowledge map.

Figure 5:
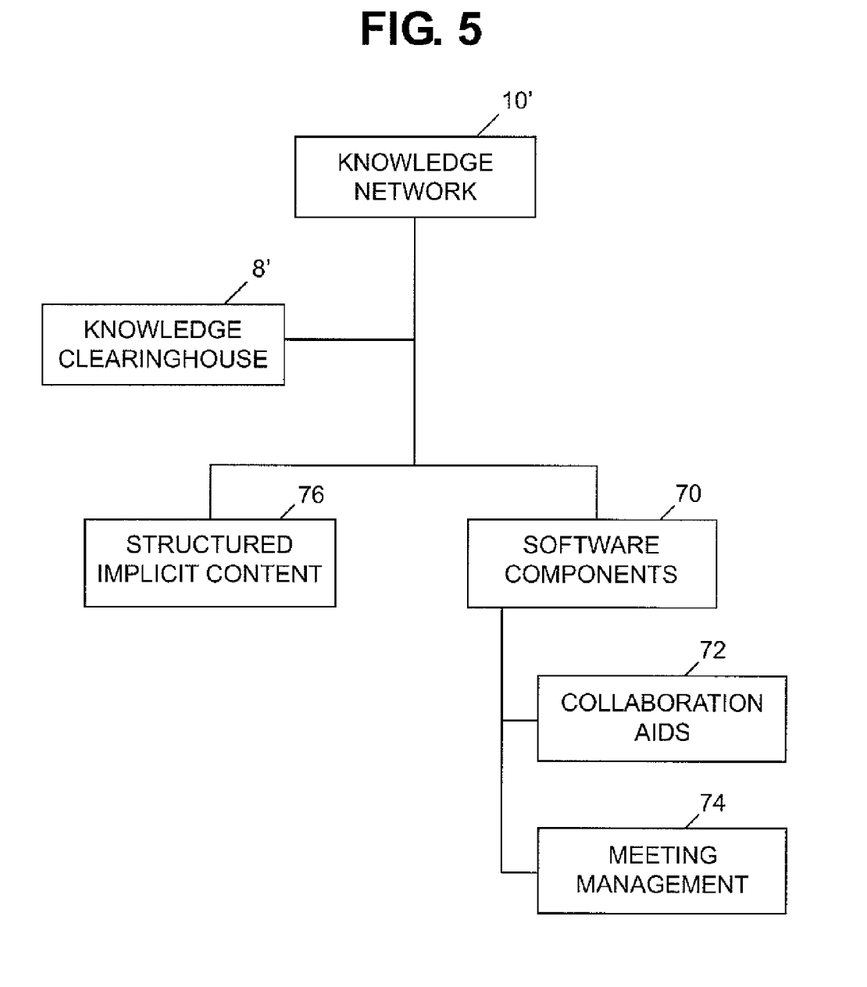
FIG. 5 is a schematic representation of a knowledge network.

After development of knowledge clearinghouse 8 is complete, a decision is made (gate 9) whether to further structure initial domain model 4' by developing a knowledge network 10. Alternatively, clearinghouse 8' can be maintained as a highly-structured domain 16. (See FIG. 1.) A knowledge network 10', as shown in FIG. 5, extends the capability of clearinghouse 8' by providing mediated access to experts via collaboration 72 and meeting management 74 tools. The core of knowledge network 10' is a software component 70 that manages the collaboration and meeting management tools. Software component 70 is used to electronically mediate the sharing of structured implicit content 76 of domain 2, as well as the calendaring aids necessary to coordinate the scheduling of face-to-face meetings to exchange knowledge.

Implicit content, again, is content that is held only within the minds of individuals or groups. Such knowledge has not been articulated and recorded in any tangible means of expression and, therefore, cannot be managed through clearinghouse 8'. Network 10', therefore, is useful as a portal to provide knowledge workers an efficient way to find, access, and use the relevant implicit content no matter where it is located. In other words, knowledge network 10' is a technology-based platform for connecting people to people.

In addition to a technology-based platform for connecting people to people, structuring implicit content involves the managerial, organizational and social devices and practices that are used to structure and make more accessible the tacit knowledge that is held in the minds of the knowledge workers in the domain. Examples include teams, communities of practice, informal networks, special roles, incentives for knowledge sharing and common mental models to name just a few. The knowledge network therefore extends the capabilities of the clearinghouse through a technology-based platform for collaboration and the appropriate organizational enablers and management practices for structuring implicit content.

As with gates 5 and 7, similar criteria exists for gate 9 for determining the value of developing knowledge network 10. For example, to proceed through gate 9, the specifications and buy/build cost estimates for developing knowledge network 10 should be evaluated. In addition, a model of how value will be created beyond knowledge map 6 and/or knowledge clearinghouse 8 should be constructed, and any risks and strategies for managing those risks should be identified. This criteria can be used to make a decision whether to proceed or not on the basis of cost/benefits and risks in a way that fits the tolerances and requirements of the sponsoring organization or company. In the case where the domain contains explicit content only (i.e., there is no implicit content to structure) there would be no value in creating a knowledge network. In such a domain, the knowledge clearinghouse represents a natural termination point of the domain structuring process.

As with knowledge map 6' and clearinghouse 8', network 10' is a device for structuring the content scope of domain 2. Unlike map 6' and clearinghouse 8', network 10' provides additional structuring to the content that is implicit, rather than the explicit content, as previously discussed. In this way, a knowledge network is a narrower, but deeper, structuring agent than a knowledge map. Knowledge network 10' can provide a technology-based means for knowledge workers to share knowledge and collaboratively solve problems. This can have the effect of lowering direct, transactional and quality costs, thus, adding value to the organization. For example, map 6' catalogs implicit content by providing a directory of experts and a skills database that defines who knows what within domain 2. Map 6' may provide contact phone numbers, email addresses, and homepage URLs for the various experts. Knowledge network 10' provides communication and collaboration aids to tap this content. Examples of technologies that support knowledge networking include email, discussion databases, collaborative filtering, web-chat facilities, electronic meeting software and desktop videoconferencing. Useful features of network 10' may include an open modular architecture facilitating the incremental addition of functionality, discussion databases and electronic bulletin boards, calendaring and scheduling software, remote application sharing (e.g., shared virtual whiteboard) chatrooms, web conferences and electronic classroom functionality, use tracking and monitoring functionality, among others. It is appreciated that it is not necessary to implement all the functionality of clearinghouse 8' before implementing the functionality of network 10' to further structure the domain. Because at least some aspect of every domain is different, the amount of and type of structuring that is required to maximize the value it creates will vary. Furthermore, the amount of structuring that is cost-beneficial may depend on the pre-existing technology infrastructure. The more sophisticated the existing infrastructure, the less it will cost to implement the map, clearinghouse and network.

Developing knowledge network 10 provides further structuring in the following ways. Similar to a communications network (e.g., phone and fax system), knowledge network 10' acts as a hub for coordinating ad hoc and planned people-to-people communications within domain 2. Just as clearinghouse 8' deepens structuring around the explicit content defined by map 6', network 10' deepens the structuring around implicit content also defined by map 6'.

As with map 6' and clearinghouse 8', it would be useful for network 10' to capture detailed information on the frequency and type of on-line and off-line use of implicit content. These "use statistics" are interpreted using the value model to make important decisions about which resources are the most valuable in domain 2 and how it should be further structured. More specifically, this information is used to develop a knowledge network by incrementally extending the functionality of the knowledge map/clearinghouse by adding the features listed above.

Although the foregoing method has been described, one skilled in the art can easily ascertain the essential characteristics of the method, and various changes and modifications may be made to adapt the various uses and characteristics without departing from the spirit and scope of this disclosure, as described by the claims which follow.

What is claimed is:

1. A method of structuring contents of an unstructured domain so as to impart value to the domain, comprising the steps of:
   identifying a plurality of elements of information associated with an unstructured domain;
   developing an initial domain model for utilizing the plurality of elements of information associated with the domain to create value;
   developing an estimate of costs associated with developing a knowledge map cataloging and describing at least some of said elements of information associated with the domain, and developing an estimate of the value of said knowledge map;
   comparing the estimates of costs and value and, based on said comparison, performing at least one of the steps of:
      storing and maintaining said model and said plurality of elements of information; and
      developing and storing the knowledge map so as to add structure and impart value to said domain.

2. The method of claim 1, wherein the step of developing an initial domain model comprises at least one of the steps of defining an organizational scope, defining a content scope, defining a process scope, and defining economic factors relating to the domain.

3. The method of claim 2, wherein the step of defining the organizational scope comprises the step of identifying elements of an organization affected by one or more of the plurality of elements of information associated with the domain.

4. The method of claim 2, wherein the step of defining the content scope comprises the step of identifying at least some of the plurality of elements of information as one of explicit content and implicit content.

5. The method of claim 4, wherein the step of identifying at least some of the plurality of elements as explicit content further comprises identifying at least some of said elements of information as at least one of online information and offline information.

6. The method of claim 2, wherein the step of defining a process scope comprises the step of identifying a business process that can be improved by structuring contents of the unstructured domain.

7. The method of claim 2, wherein the step of defining economic factors includes at least one of the steps of identifying costs associated with identifying and gathering at least some of the plurality of elements of information associated with the domain, identifying costs associated with detecting errors and taking actions to avoid and correct errors, identifying communication costs, and identifying costs associated with maintaining the plurality of elements of information.

8. The method of claim 2, wherein the step of defining economic factors further comprises developing an economic model for use in developing the estimates of costs and value associated with developing the knowledge map.

9. The method of claim 1, further comprising the steps of:
   developing an estimate of costs associated with developing a knowledge clearing house, which provides centralized access to online elements of information associated with the domain and a cataloging of offline elements of information associated with the domain, and developing an estimate of the value of said knowledge clearing house;
   comparing the estimates of costs and value developed in connection with the knowledge clearing house and, based on said comparison, performing at least one of the steps of:
      storing and maintaining the model, said plurality of elements of information, and said knowledge map; and
      developing and storing the knowledge clearing house so as to add structure and impart value to said domain.

10. The method of claim 9, wherein the step of determining an estimate of the value of said knowledge clearing house comprises the step of creating a model for determining how additional value will be created by structuring the domain beyond the knowledge map.

11. The method of claim 9, wherein said knowledge clearing house provides direct access to explicit content of the domain.

12. The method of claim 9, wherein said knowledge clearing house comprises offline content, software components, and online content.

13. The method of claim 9, further comprising the steps of:
   developing an estimate of costs associated with developing a knowledge network and developing an estimate of the value of said knowledge network;
   comparing the estimates of costs and value developed in connection with the knowledge network and based upon said comparison, performing at least one of the steps of:
      storing and maintaining the model, said plurality of elements of information, said knowledge map and said knowledge clearing house; and
      developing and storing the knowledge network so as to add structure and impart value to said domain.

14. The method of claim 13, wherein said knowledge network comprises a software component for providing mediated access to and managing collaboration with experts, and for providing meeting management tools.

* * * * *